(12) United States Patent
La Mura et al.

(10) Patent No.: US 6,676,521 B1
(45) Date of Patent: Jan. 13, 2004

(54) ENHANCED ONLINE GAME MECHANISMS

(75) Inventors: Pierfrancesco La Mura, Palo Alto, CA (US); Moshe Tennenholtz, Palo Alto, CA (US); Yoav Shoham, Palo Alto, CA (US)

(73) Assignee: Cariocas, Inc., San Francisco, CA (US)

( * ) Notice: Subject to any disclaimer, the term of this patent is extended or adjusted under 35 U.S.C. 154(b) by 382 days.

(21) Appl. No.: 09/642,196

(22) Filed: Aug. 18, 2000

(51) Int. Cl.[7] .............................................. A63F 13/00
(52) U.S. Cl. ............................................ 463/42; 463/9
(58) Field of Search ....................... 463/1, 9, 20, 42, 463/25, 29; 705/1, 14, 15

(56) References Cited

U.S. PATENT DOCUMENTS

| | | | | |
|---|---|---|---|---|
| 5,213,337 A | * | 5/1993 | Sherman | 463/40 |
| 5,823,879 A | | 10/1998 | Goldberg et al. | 463/42 |
| 5,916,024 A | | 6/1999 | Von Kohorn | 463/40 |
| 5,964,660 A | | 10/1999 | James et al. | 463/1 |
| 6,061,660 A | * | 5/2000 | Eggleston et al. | 705/14 |
| 6,070,874 A | * | 6/2000 | Ivers | 273/292 |
| 6,093,100 A | * | 7/2000 | Singer et al. | 463/13 |
| 6,146,272 A | * | 11/2000 | Walker et al. | 463/17 |
| 6,224,486 B1 | * | 5/2001 | Walker et al. | 463/42 |
| 6,267,379 B1 | * | 7/2001 | Forrest et al. | 273/431 |
| 6,394,899 B1 | * | 5/2002 | Walker | 463/9 |

FOREIGN PATENT DOCUMENTS

| WO | WO 00/37154 | 6/2000 | ............ A63F/13/12 |
|---|---|---|---|

* cited by examiner

Primary Examiner—John M Hotaling, II
(74) Attorney, Agent, or Firm—Sierra Patent Group, Ltd.

(57) ABSTRACT

A method of providing interactive online communication through a network comprising creating a population from a plurality of network participants in which the said participants are operatively coupled to participate in a game, then selecting a sub-population from the population based upon some pre-selected criteria, inviting the population to said game and receiving a confirmation from said sub-population.

4 Claims, 6 Drawing Sheets

ENHANCED ONLINE GAME MECHANISMS

BACKGROUND OF THE INVENTION

1. Field of the Invention

This invention pertains generally to online transactions. More particularly, the invention is an enhanced system and method for carrying out online transactions and/or distributing awards using a "gaming" transaction handler.

2. The Prior Art

The use of the global information network known as the Internet as a medium for carrying out sales transactions (i.e. online transactions) is known. The popularity of the Internet with home and business computer users has provided a market opportunity to provide transaction mechanisms for such Internet users. Retailers, for example, have launched "online catalogs" via Web pages as an alternative (or additional) means for selling their products or services to their customers.

Many times, retailers will offer "Special Deals" to online consumers as an incentive to utilize their online catalog or services. Typically, the retailer does not advertise these specials to consumers; instead, a consumer is rewarded by visiting the Web site on their own accord. One method that may be utilized to offer these "Special Deals" to a larger population is described herein. Whereby an online population may be selectively invited to participate in online games. The participants may then be awarded prizes such as discounts, rebates, or goods in association with participating in these online games.

Recently, online games have gained popularity with Internet users. For example, game users who purchase a game whose source code has been designed to allow multiple participants to connect over the internet may join together and work as teams to defeat either an opposing team or a computer player. Additionally, many of these games allow members of each team to communicate while playing the game, but the game actions are then carried out individually. Additionally, participants must actively seek out a game to participate in once they have accessed a network such as the Internet. Additionally, most games require a small number of participants, and cannot be played by a population of arbitrary size.

The Internet also hosts many other games that may be competitive, noncompetitive, and cooperative. Such games must be initiated by users who are actively seeking out game play on the internet.

Accordingly, there is a need for an apparatus that provides for selection of game participants among a larger percentage of people who communicate through a network.

Additionally, there is a need for an apparatus that provides for an online game that allow games designed for a small number of participants to be played by a large pool of participants.

Additionally, there is a need for an apparatus that provides for an online game that can be played by a population of arbitrary size.

Additionally, there is a need for an apparatus that provides for an online game that may be played asynchronously.

Further still, there is a need for an apparatus that provides for a online game that allows a population to participate through a single action.

The present invention satisfies these needs, as well as others, and generally overcomes the deficiencies found in the background art.

BRIEF DESCRIPTION OF THE INVENTION

The present invention is a system and method for carrying out enhanced online gaming. The online game system comprises an interface module operatively coupled for communication with a transaction handler. In general, the operations of the interface module together with the transaction handler provide an online game system in which participants of the system may engage in game play.

The interface module provides an interface between participants of the online game. In particular, the interface module manages communication requests from the participants (gamers, host system) of the system as described below more fully. The interface module further manages communication between the participants of the system, such as, when one participant sends a communication to another participant.

The transaction handler defines a set of "moves" or "actions" that may be carried out by the participants of the system. In particular the transaction handler allows the selection of participants who are to participate in the online game, messaging between participants, game moves, and game outcomes. As described more fully below the selection of participants may be chosen based upon some arbitrary data that has been collected from online participants, or may be from an alternative source. Likewise, the participants may affect the outcome of the game through the use of messaging between and among participants of the game.

Examples of such online game systems are: Matching games, Community Games, Population games, and One-Click games.

Matching games are designed whereby the participants are chosen based upon some pre-selected criteria such as spending habits or other similar demographic information and invited to participate in an online game, thereby allowing manufacturers and resellers to target specific groups of online participants. The game characteristics and the type of awards may be matched with the characteristics of the participants, in order to provide a more challenging and entertaining gaming experience. Furthermore, some characteristics of the potential opponents may be revealed to the participants as they are invited to play the game, in order to entice them to accept the challenge to participate in the online game.

A second type of an online game is a Community game. Community games are designed to allow participants to come together in an online environment and compete for awards. The players are partitioned into at least one team, thereby allowing a variable number of players to compete in games designed for a fixed number of players. Additionally, each team is provided with a mechanism for deliberating a joint action. The deliberation mechanism may include support for messaging, as well as voting capabilities. Examples of community games, which will be described in more detail below, are Visual Puzzle games and Team Trivia games.

A third embodiment of an online game that may be played is Population games. Population games are games that are infinitely scaleable, thereby allowing a population of arbitrary size to participate in the game. The outcome of a Population game depends on the individual moves of the participants, and on aggregate measures. Aggregate measures may be defined as the percentages of players' moves in the population.

Alternatively, the aggregate measures may be defined by past participants moves which are generated from a game that has already been played. The past participants moves are stored in a database that is operatively coupled to the gaming module of the online game system, whereby after each game the moves of the participants are stored for use in the next game.

For example, a participant in the Population game may choose "R", the participant's choice of "R" is compared against the database to determine the percentage of participants who had chosen "R". If the participant's choice of "R" falls below a pre-determined percentage than the participant receives an award, if the participant's choice is greater than a pre-determined percentage, then the participant may receive nothing.

Alternatively, the award may be reduced by a pre-determined amount or changed depending upon the percentage of participants who chose "R" in the past games. For example, if the participant's choice is "R" and forty-five percent of the past players chose "R" the participant receives an award, if sixty percent of past participants chose "R" then the participant would receive a lesser award or possibly no award at all.

One-Click games allow participants of an online game to play asynchronously. Additionally, a One-Click game allows the participants to fully participate in the online game through a single action selected from a plurality of available moves.

The invention further relates to machine-readable media on which are stored the embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

Objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
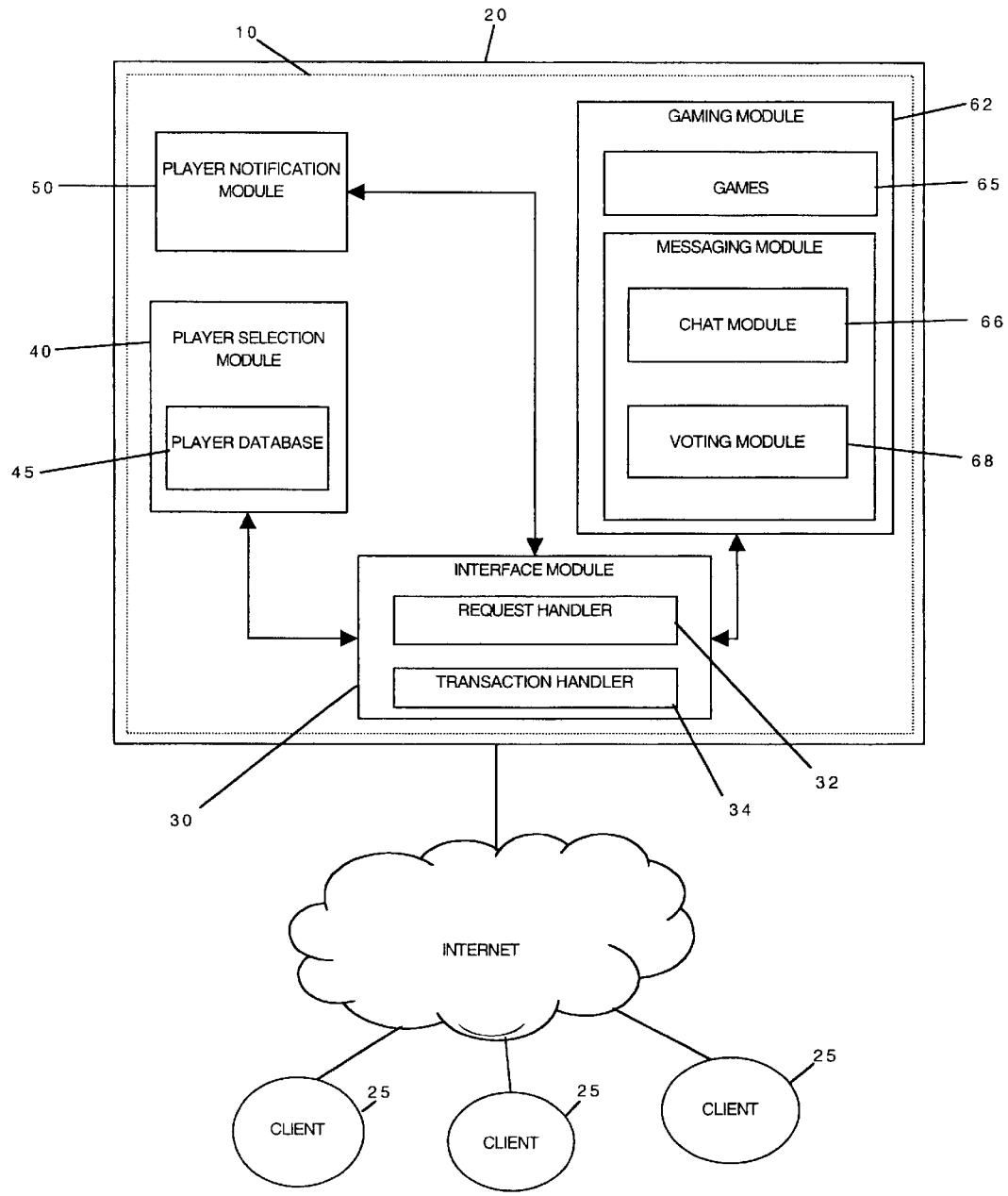
FIG. 1 is a functional block diagram depicting an illustrative online game system in accordance with the present invention.

Referring more specifically to the drawings, for illustrative purposes the present invention is embodied in the apparatus shown in FIG. 1 and the methods outlined in FIGS. 2 through 7. It will be appreciated that the apparatus may vary as to the order of the methods, acts, or details without departing from the basic concepts disclosed herein. The invention is disclosed generally in terms of an online gaming system, although numerous other uses for the invention will suggest themselves to persons of ordinary skill in the art.

Referring first to FIG. 1, there is shown a functional block diagram depicting an illustrative online gaming system (OGS) 10 in accordance with the present invention. The OGS 10 operates within a network server 20 as depicted in FIG. 1. The network server 20 can be any standard data processing means or computer, including a minicomputer, a microcomputer, a UNIX® machine, a mainframe machine, a personal computer (PC) such as an INTEL® based processing computer or clone thereof, an APPLE® computer or clone thereof or, a SUN® workstation, or other appropriate computer.

Server 20 generally includes conventional computer components (not shown), such as a motherboard, a central processing unit (CPU), random access memory (RAM), display adapter, hard disk drive, a removable storage device such as a floppy drive, CD-ROM, flash-ROM, tape drive, PCMCIA card and/or other removable media, a monitor, a keyboard, a mouse and/or other user interface means, a modem, network interface card (NIC), and/or other conventional input/output devices. Server 20 is equipped with a conventional server operating system (not shown) such as UNIX®, WINDOWS® NT, NOVELL®, SOLARIS®, LINUX or other server operating system. Server 20 may also be equipped with web server software (not shown) such as APACHE®, NETSCAPE®, INTERNET INFORMATION SERVER™(IIS), or other appropriate web server software loaded for handling HTTP (hypertext transfer protocol) or Web page requests.

Alternatively, the games provided by the OGS 10 may operate or execute within a client device. The games may be communicated to the client device via a platform independent language such as JAVA SCRIPT or other similar languages. The client device may comprise any of the above mentioned machines, software, and hardware devices described above.

In accordance with the invention OGS 10 further comprises an interface module 30 operatively coupled for communication with a player selection module 40, player notification module 50, and gaming module 60, which are discussed in more detail below.

As illustrated in FIG. 1, server 20 is to be operatively coupled for communication to at least one client node 25. Although, typically server 20 will be coupled to a plurality of nodes 25, each node 25 being operatively coupled for communication with the OGS 10, as shown in FIG. 1. Each client node 25 preferably comprises a standard computer such as a minicomputer, a microcomputer, a UNIX® machine, mainframe machine, personal computer, such as INTEL®, APPLE®, or SUN® based processing computer or clone thereof. Further still, client node 25 may be comprised of personal digital assistants (PDAs), such as PALM PILOT®, HANDSPRING VISOR®, or WINDOWS CE®. Each client node 25 may also include typical computer components (not shown), such as a motherboard, CPU, RAM, ROM, hard disk drive, display adapter, a removable storage device, such as a floppy drive, CD-ROM, flash-ROM, tape drive, PCMCIA cards and/or other removable media, monitor, keyboard, mouse and/or other user interface means, a modem, a network interface card (NIC), and/or other conventional input/output devices. Each client node 25 may also be equipped with an operating system (not shown) such as UNIX®, WINDOWS®, LINUX or the like. Each client node 25 is further equipped with a Web Browser program (not shown) such as NETSCAPE®, INTERNET EXPLORER®, AOL®, or like browsing software for client computers.

Each client node 25 may normally be embedded in a conventional desktop, laptop, handheld, or "tower" machine, but alternatively may be embodied in a handheld personal digital assistant (PDA), a cellular phone capable or browsing Web pages, a pager capable of browsing Web pages, a dumb terminal capable of browsing Web pages, an internet terminal capable of browsing Web pages such as WEBTV®, or other Web browsing devices.

Each client node 25 may be networked for communication with server 20. Typically, client node 25 is operatively coupled to communicate with server 20 via the Internet through a phone connection using a modem and a telephone line (not shown), in a standard fashion. Client node 25 may alternatively be coupled to server 20 via a network (e.g. LAN, WAN, etc.) connection. It will be apparent to those skilled in the art having the benefit of this disclosure that alternative means for networking client(s) 25 and server 20 may also be utilized. Such connections may comprise, direct point to point connection using modems, cables, wireless networking technology, satellite connection, direct port to port connection utilizing infrared, serial, parallel, USB, FireWire/IEEE-1394, and other means known in the art. Generally, client nodes 25 and server 20 communicate using the TCP/IP (transfer control protocol/internet protocol). However, other protocols for communication may also be utilized, including PPTP, NetBEUI over TCP/IP, and other appropriate network protocols. Furthermore, one could use cell phones and voice-activated protocols.

While depicted as a single computer for purposes of disclosing an exemplary embodiment of the present invention, server 20 may comprise a plurality of servers (i.e., a server farm) to provide robust services to the client node 25, as is known in the art.

As described above and illustrated in FIG. 1, OGS 10 comprises: interface module 30 operatively coupled for communication with a player selection module 40, player notification module 50, and gaming module 60. Referring again to FIG. 1, player selection module may further include a player database 45 operatively coupled to interface 30. It will be appreciated that the structure of the data storage facility in FIG. 1 (player database 45) is only exemplary, and other database or storage facility arrangements may be used with the invention.

The interface module 30 comprises a request handler 32 coupled for communication with a transaction handler 34. The request handler 32 is operatively coupled for communication with the client node(s) 25 normally via a network connection, such as an Internet connection. The request handler 32 carries out the operation of managing communications between the client node(s) 25 and the OGS 10. For example, the OGS 10 may be configured as a "web" or "http" application, in which case the request handler 32 manages http requests from users of the client node(s) 25. Accordingly, the request handler 32 provides an interface (e.g. command line user interface, graphical user interface, or voice activated user interface) for online game participants to engage in game play via request submitted from the client node(s) 25 to the OGS 10. A request issued by a participant is communicated to the transaction handler 34 for further processing. The result of the participant's request is communicated as a reply to the user via request handler 32.

The transaction handler 34 processes requests from participants of OGS 10, which are communicated to the transaction handler 34 via the request handler 32. For example, when a participant is actively involved within an online game, the transaction handler 34 manages the moves, votes or actions of the game participant.

The transaction handler 34 is coupled to the player selection module 40, player notification module 50 and gaming module 60 for storage and retrieval of data necessary to the online game. As shown in FIG. 1, player selection module 40 further includes player database 45. Player database 45 maintains a database of information about the potential participants of the game. The structure of player database 45 may comprise any suitable format for data storage and retrieval such as a relational table, for example.

The interface module 30 is further operatively coupled for communication to player notification unit 50, and game module 60. The player notification module 50 receives input from the player selection module 40. The player notification module 50 defines the participants who will be allowed to participate in the online game. The game module 60 defines generally which games the participants will be allowed to play. Such games may include, for example, trivia games, puzzle games, competitive games, cooperative games, or other appropriate games.

When notification is sent to a participant by OGS 10, the transaction handler 34 determines whether the request is proper according to the player selection module 40. Unlike prior art on online gaming, the online game system of the present invention may seek out participants instead of having the participants seek out a game to participate in. This relationship is described more fully below in conjunction with FIGS. 2 through 6.

According to the present invention, the online game comprises a start phase, which is initiated when a game participant or multiple game participants are selected from a population of potential game participants, thereby creating a sub-population of game participants from a larger population of potential participants.

As illustrated in FIG. 1, gaming module 60 further comprises messaging module 65. Messaging module 65 further includes chat module 66 and voting module 68. In one embodiment, after the player selection module 40 has selected at least one participant to participate in an online game and the player notification module 50 has notified such participant(s), and the participants have sent confirmation to the transaction handler. The gaming module 60 initiates the game by selecting a game to be played from game database 62. The game to be played is selected according to the number of participants who have been invited to participate in game play, or the game may have been pre-selected prior to contacting participants.

Figure 2:
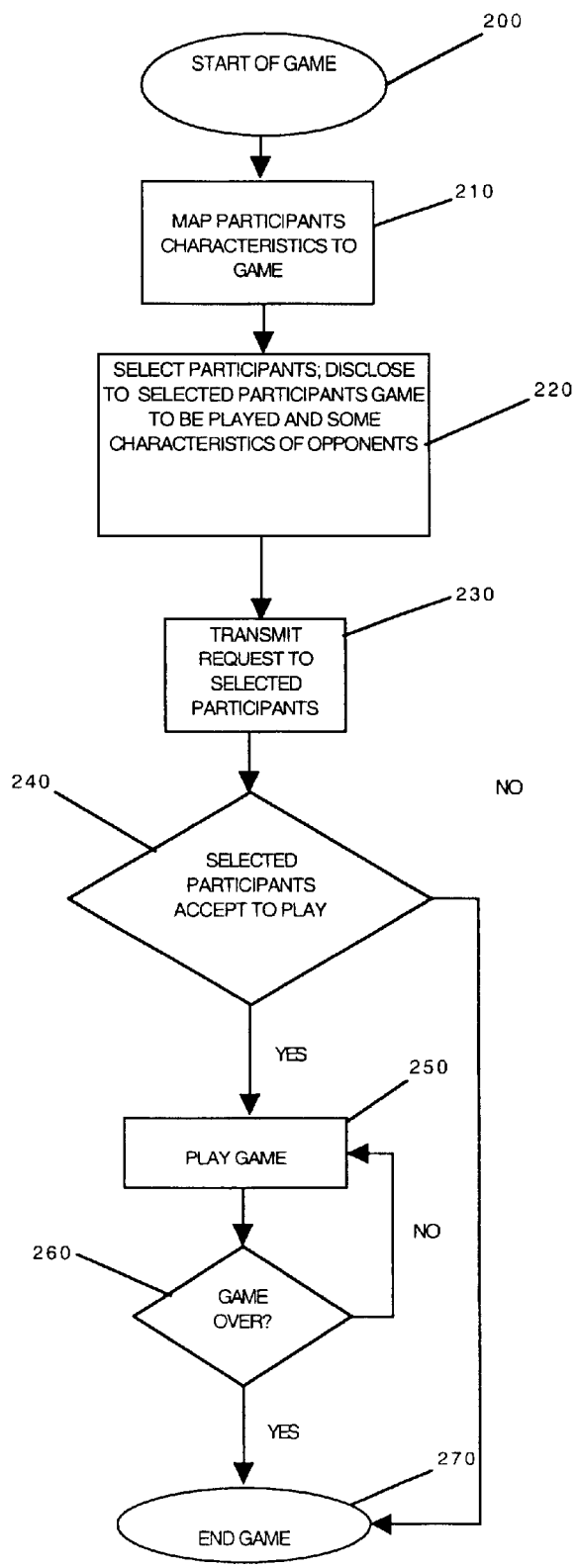
FIG. 2 is a logical flow diagram depicting an example of a matching game system.

In one embodiment, as shown in FIG. 2, participants' demographical information is utilized to select a game to invite them to participate in. The game is chosen in this manner in order to selectively target specific groups of people. For example, if the item to be awarded is a car part, then the game system is designed to target individuals whom are known to own a car. After the participants have been selected, an invitation to participate in the online game system 10 is transmitted to the participant. The participant will also receive an overview of the game along with the request to participate. The participant is given the overview such that they can then determine if they wish to participate in the online game. After a request has been transmitted, the OGS 10 then receives confirmation to participate from the selected participants. After confirmation has been received the game begins.

Figure 3:
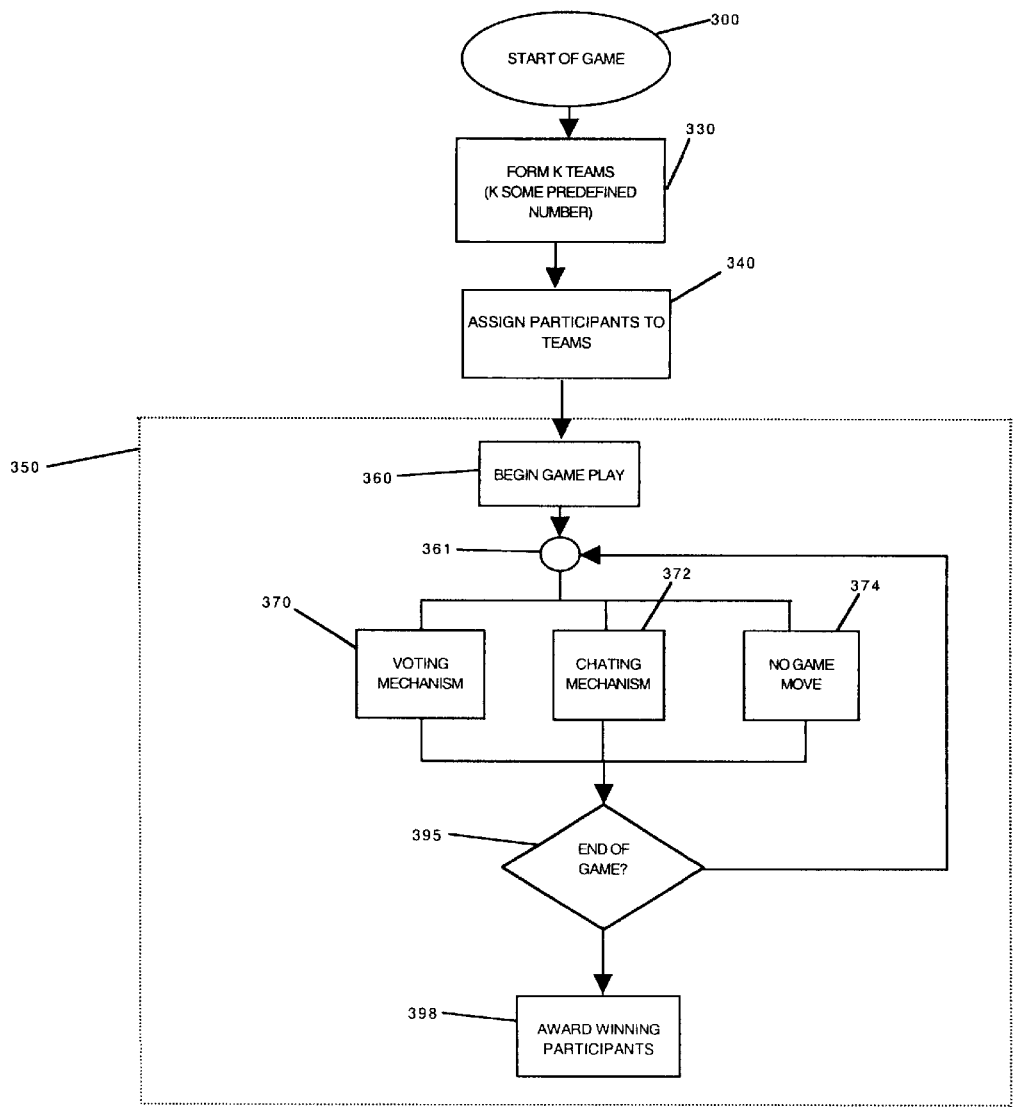
FIG. 3 is a logical flow diagram depicting an example of a community game.

An alternative embodiment is shown in FIG. 3, where participants are selected to participate together as a team. To participate as a team, participants may utilize chat module 66 within messaging module 60. Chat module 66 allows participants who are on the same team to discuss game moves prior to making a move. The discussions that take place between team members are private between the members of each team. Voting module 68 may be further included within messaging module 65. Voting module 68 allows each player to "cast a vote" as to the move or step which they wish to take in the game. In one embodiment, votes from each team are combined and the game move or action with the highest number of votes is executed. In an alternative embodiment, the voting module holds the game in a state of readiness until a vote is received from each player or team member. Thereby allowing the participants to participate in online gaming without having to be "actively logged onto a network." Thus allowing the online game to be played asynchronously. In general, at least one game is provided during one round of participant selection.

As shown in FIG. 1, a player database is used to select the game participants. For example, the player database contains a plurality of data that can be combined or used separately to choose participants for the game. Examples of such data are demographic information (collected through mailers, catalogue sales, Internet "cookies", or imputed by the participant, geographical information, or other similar data). Alternatively, participants may be chosen according to an alternative process. An example of one such process would be where a potential participant receives a cash register receipt after making a purchase, on the receipt is located a "code", the participant then enters this "code" on the retailers Webpage. If the code entered is one that has been pre-selected by the OGS 10, then the participant is invited to participate in an online game.

The method and operation of the invention will more fully be understood with reference to the logical flow diagrams FIGS. 2 through 6, as well as FIG. 1.

Figure 4:
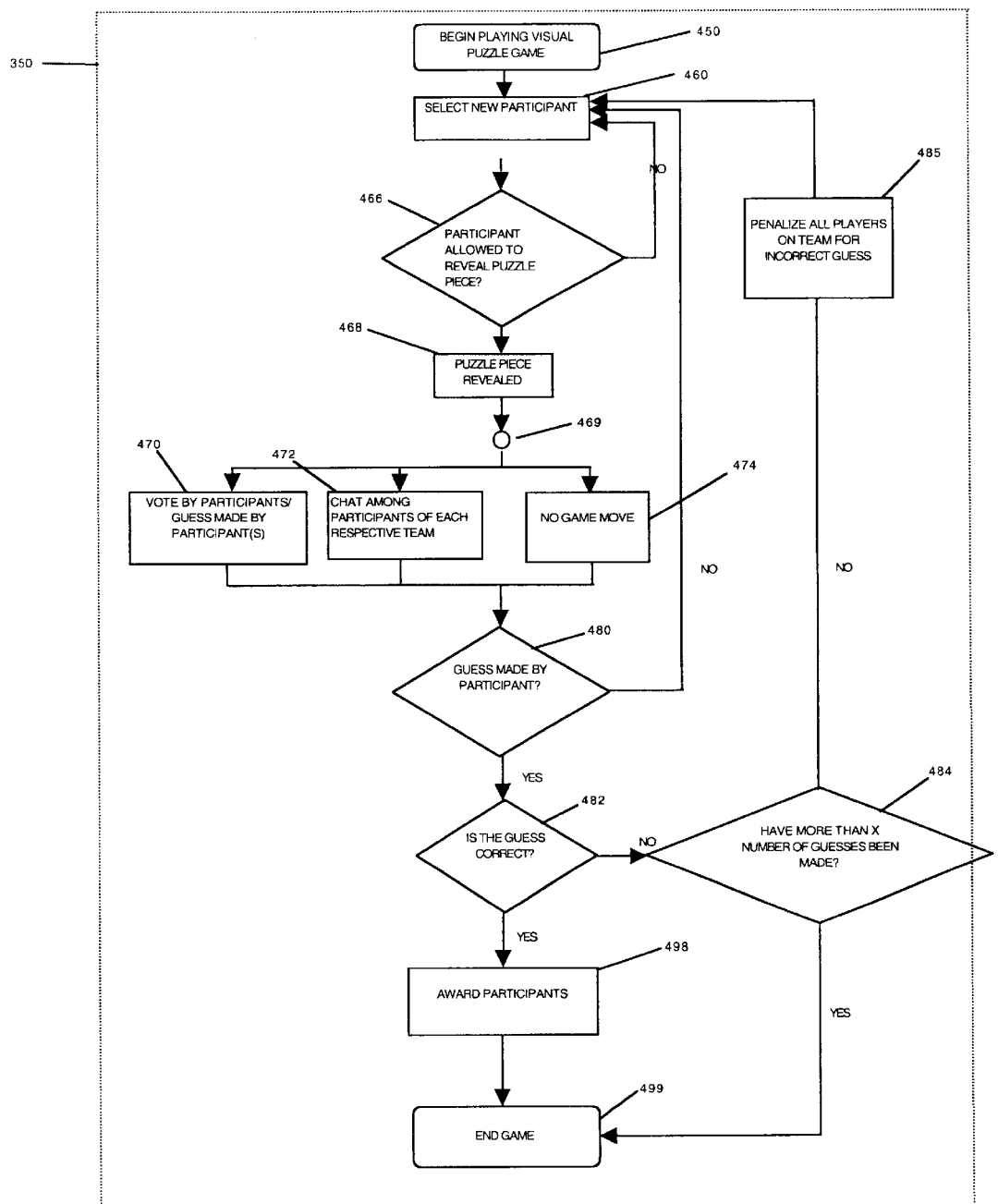
FIG. 4 is a logical flow diagram depicting a community game in further detail, more specifically depicting a visual puzzle game.
Figure 5:
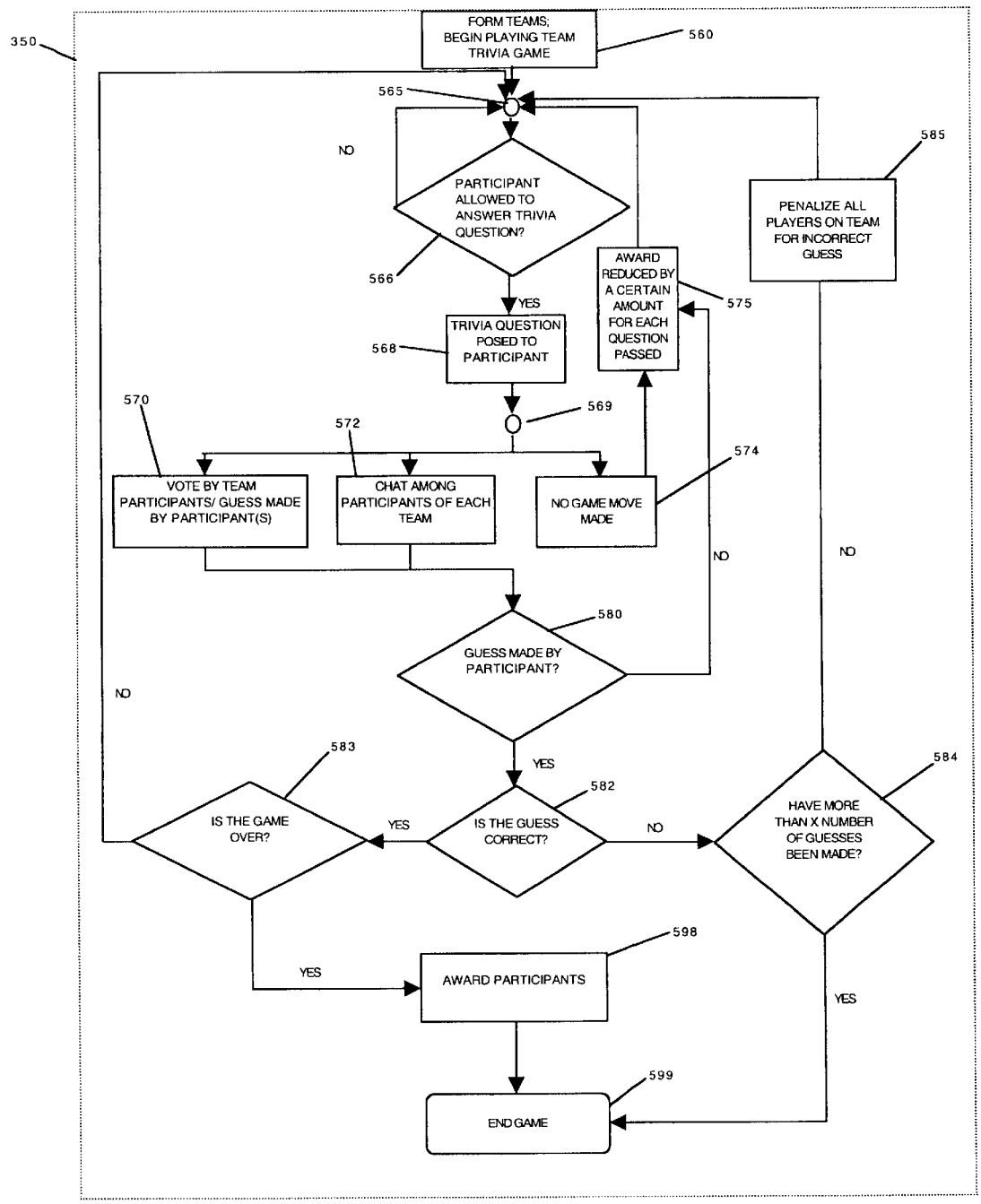
FIG. 5 is a logical flow diagram depicting a community game in further detail, more specifically depicting a team trivia game.
Figure 6:
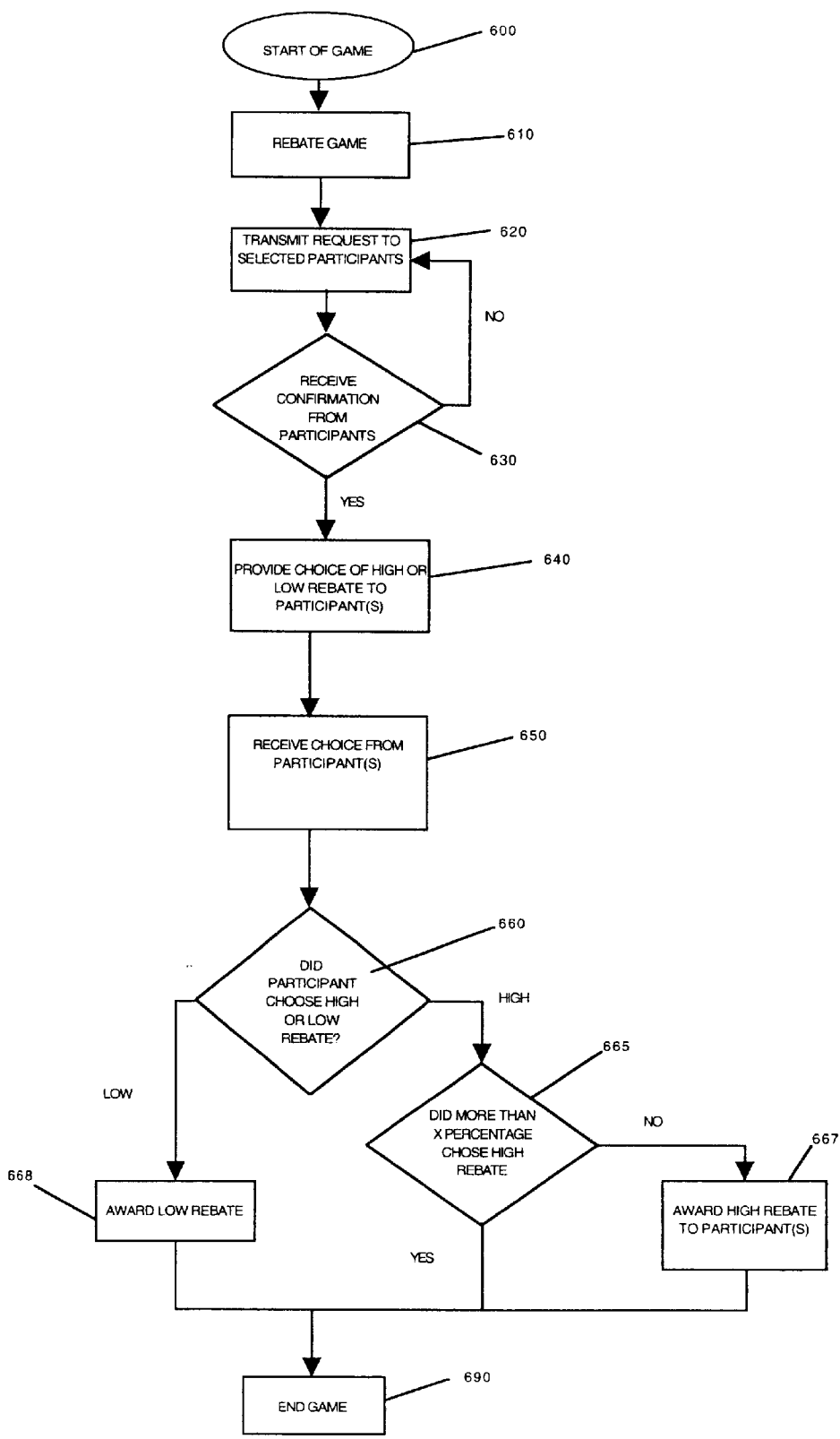
FIG. 6 is a logical flow diagram depicting the acts associated with the population game.

FIG. 2 is a logical flow diagram depicting the acts associated with illustrative online Matching game system 10 sequence in accordance with the present invention. FIG. 3 is a logical flow diagram depicting the acts associated with an online Community game system sequence in accordance with the present invention. FIG. 4 is a logical flow diagram depicting the acts associated with an alternative embodiment of the Community game system, more specifically depicting the Visual puzzle game in accordance with the present invention. FIG. 5 is a logical flow diagram depicting the acts associated with a second alternative embodiment of the Community game system sequence, more specifically depicting the Team Trivia game system in accordance with the present invention. FIG. 6 is a logical flow diagram depicting the acts associated with the One-Click game system sequence in accordance with the present invention. FIG. 7 is a logical flow diagram depicting the acts associated with the Population game system sequence in accordance with the present invention. The order of actions as illustrated in FIGS. 2 through 7 and described below are only exemplary and should not be considered limiting.

Referring now to FIG. 2, at process 200 the online Matching game system 10 begins. This process begins with Block 210 and the gathering of demographical data regarding potential participants. The demographical data .may consist of past purchases made by the participant at a vendors Website or retail establishment, or alternatively, the data may be purchased from a commercial supplier of such data. Additional forms of data could be online marketing data, "cookies" collected from visitors to the businesses web site, and other similar data. Alternative methods may be used, such as those discussed above. After a data set has been chosen a game is then chosen according to the data set.

Next at Block 220 the participants are selected to participate in the online game according to the demographical data. For example, if a game is to take a substantial amount of time to complete, the participants may be chosen from a pool of participants who spend a substantial amount of time on line. For example, such a pool of participants may be college students. Alternatively, the game may require the participants to have some specialized knowledge such as automotive trivia, geographical knowledge, world history or other similar requirements. Additionally, the game may be chosen to facilitate competition between the participants.

Next at Block 230, the participants who have been selected to participate in the online game system 10 are transmitted a request to participate in the online game. The request may be transferred to those participants through the use of e-mail, online messaging or any similar methods. The request further includes a summary of the game to be played and may also include a description of some of the characteristics of the opponents, therefore the participants may chose whether or not they wish to participate in the game.

Next at Diamond 240, it is determined whether or not the participants who were invited to participate in the online game have accepted the request sent from Block 230. If the participants have not responded to the transmitted request within a certain deadline or they have declined then the game is over. Alternatively, if it is determined that the participants who were invited to participate in the online game have transmitted a confirmation then the process continues to Block 250.

Next as Block 250 the game selected in Block 210 is initiated. The game may be initiated by the rolling of virtual dice, the transmittal of a trivia question or any other similar process or procedure.

Next at Diamond 260 it is determined whether or not the game has ended. If the game has not ended then the actions of Block 250 are repeated until the game ends. Once the game reaches an end, the winner(s) are rewarded an award such as a rebate for additional online purchases, on-line cash, prizes, and similar awards. Next at block 270 the online game system 10 terminates.

Referring now to FIG. 3, there is shown an exemplary example of the online Community game system in accordance with the present invention. At process 300, the online game system 10 begins. At Block 300, a game is chosen for the participants to participate in. An example of the type of game that may be selected are poker, chess, checkers, monopoly or other similar games that can only be played with a limited number of players. The list given above should not be considered limiting, it has only been provided for exemplary reasons only.

Next at Block 330, the OGS 10, creates "K" teams (where "K" is a predetermined number) so that a variable number of participants may participate in games that can only be played by a fixed number "K" of teams. For example, if the game of chess were chosen, the number of "K" teams would be two; one team for each side, whereby the participants are allocated to one team or the other team.

Next at Block 340, the participants are divided and assigned to the "K" teams designated in Block 330.

As shown in FIG. 3, Block 350 shows a simplified version of the online Community game according to the present invention. A more detailed description and two exemplary examples will be described in more detail below in conjunction with FIGS. 4 and 5.

Next at Block 360, the online game begins. For example the beginning of the online game may start with the throwing of virtual dice, the transmittal of a trivia question to the participants, the transmittal of game "moves" or "actions" or "choices" or any other similar type process, which causes the game to be started.

At junction 361, the game participants may carry out game moves for example the participant may proceed to Block 370, Block 372 or Block 374.

As illustrated in Block 370 each team member may be given a chance to vote. The vote that each participant may be given is related to a "move, action or game choice" that must be undertaken to advance the game to a finished state. After all team members or participants have voted, or alternatively a specified time period has elapsed, the "move, action or choice" having the greatest number of votes is performed. Each of the processes or steps described above may be carried out individually or in any combination or order.

As illustrated Block 372, the participants on each team (if appropriate) may "chat" amongst themselves or vote on the game move that they wish to make. The "chat" amongst the team members may take place using the Internet (ICQ, instant messaging, or similar online discussion methods) or over a telephone. The "chat" is generally among the participants of each team respectively. Alternatively, the "chat" may be viewed or heard by all participants in the game.

Referring now to Block 374 the participants may choose to make "no game move" at this time, that is they could chose not to vote, not to answer a trivia question posed to the participants, not to make a guess as to the solution of the game or any other similar type of game move.

Next at Diamond 395, the transaction handler 34 determines whether the end of the game has been reached. If the previous moves described above do not place the game in a final position then, according to the invention, each participant is given another chance to "chat" and vote in order to advance the game to a finished state. Once the game is finalized and no more "moves" or "actions" are to be performed the "winner(s)" are notified and awarded accordingly as indicated in Block 398. Examples of such awards could be rebate coupons from retailers, online money, or monetary payoffs, or entry into a drawing, or any other similar awards. The examples, given above are merely exemplary and are in no way to be considered limiting.

Referring now to FIG. 4 there is shown a particular embodiment of the online Community game system of the present invention, more specifically FIG. 4 depicts a Visual Puzzle game.

Block 350 in conjunction with the Community game as shown in FIG. 3 and as described above depicts the overall structure of the game, whereby like numerals have been depicted to show similar processes and step of the online game system 10.

Next at Block 450, the start of game play is initiated. An example of such a game to be played is a Visual Puzzle. The game comprises a pre-selected picture or similar item that is then covered by a plurality of removable panels. The participants who have been selected to participate in the game are given the opportunity to remove at least one panel for each game move. For example, where a participant has made an online purchase, the participant may be provided with a game piece that entitles them to remove a single panel from the game. After the participant has been given the opportunity to remove a panel, the participant is given a chance to "guess" what the underlying picture is. If the participant decides to make a guess, and the guess is incorrect, all of the participants may be penalized for the incorrect guess. Furthermore, the game may end if a pre-determined number of incorrect guesses have been made. Alternatively, if the participant's guess is the correct answer, all of the participants in the game are given an award. The award may comprise; on-line money, rebates, free merchandise, money or any similar rewards. Additionally, the participant who guesses the correct answer may be rewarded with a greater sum or prize than the other participants. Additionally, instead of having a picture that is covered by removable panels, it is contemplated that the participant may chose a puzzle piece from a plurality of pieces to insert into a puzzle. Then the participant is given the chance to guess what the subject matter of the puzzle is according to the method discussed above.

At Block 460 a new participant is selected to play the game and join the team of previous participants. Next, at Diamond 466, it is determined whether the new participant is allowed to make a game move. For example, a participant is allowed to make a game move if they have received a game piece. A game piece may be received along with the actions of an online purchase, filling out a demographic survey online or other similar actions. If the participant is not allowed to make a game move, Block 460 is carried out. If the participant is allowed to make a game move, the game advances to Block 468.

Next at Block 468, information is revealed to the participant, or alternatively to all of the participants in the team. Such information revelation may be the removal of a panel from a picture hidden by multiple panels. Alternatively, the participant may be given a puzzle piece, which they must fit into an online virtual puzzle.

Next at Junction 469, the game participant(s) may carry out game moves. Referring now to Block 470, the participant(s) may be given the chance to vote or make a guess as to what the solution to the visual puzzle is. As illustrated in Block 472, the participants of a team (if appropriate) may "chat". The "chat" amongst the team members may take place using the Internet (ICQ, instant messaging, or similar online discussion methods) or over a telephone. The "chat" is generally among the participants of each team respectively. Alternatively, the "chat" may be viewed or heard by all participants in the game. Alternatively, the participant or each of the participants in the team may decide not to make a game move at this time. Each of the processes or steps described above may be carried out individually or in any combination or order.

Next at Diamond 480, it is determined whether the participant(s) made a guess as to the solution of the game. If a guess was not made then Block 460 is carried out and the participant(s) continue to participate in the game. If a guess was made, Diamond 482 is carried out. Next at Diamond 482, it is determined whether the guess made by the participant(s) was correct. If the guess was not correct then Diamond 484 is carried out. Diamond 484 will be discussed in detail below.

Next if the guess made by the participant(s) was correct, at Block 482, the participant(s) in the game are awarded prizes for successfully completing the game. Such rewards may be rebates, online cash, money or any similar types of awards. Additionally, the participant who ventured the correct guess may be awarded a larger rebate than the rest of the participants in the team. Block 499 is then carried out and the game ends.

Alternatively, at Diamond 484, it is determined whether participants have made a predetermined number of incorrect guesses. If the number of wrong guesses has not been reached then Block 485 is performed. The process of Block 485 will be discussed in detail below. If the number of wrong guesses made equals a predetermined limit, then Block 499 is performed and the game ends as described above.

Next at Block 485, all of the participants who are engaged in playing the game are penalized for the incorrect guess by the participant(s). Such a penalty could include a lessening of the overall award offered to the winner(s) of the game.

The remainder of the process is carried out according to the description given above for FIG. 3, wherein like reference numerals have been utilized to depict the processes described above.

Referring now to FIG. 5 there is shown an embodiment of the online Community game system of the present invention, more specifically FIG. 5 depicts the Team Trivia game.

Block 350 in conjunction with the Community game as shown in FIG. 3 and as described above depicts the overall structure of the game, whereby like numerals have been depicted to show similar processes and steps of the online game system 10.

Next at Block 560, the start of game play is initiated. An example of such a game to be played is a Team Trivia. The game comprises a trivia game in which the participants are partitioned into competing teams, and are posed trivia questions. The trivia questions may be specific to one distinct category, such as world history, or alternatively the trivia questions may be chosen from multiple subjects. At each round of play, the participants who have been selected to make a move are given the opportunity to answer a trivia question. An example of being allowed to answer a trivia question would be where the participant has made an online purchase, with this purchase comes a game piece that entitles them to answer a trivia question from the game. If the answer given by the participant is correct, at the end of the game all the team members are rewarded accordingly. The game ends according to some predefined expiration event. The awards will generally depend on the individual performance in the trivia game, as well as on the joint performance of each team. In particular, the participant who guesses the correct answer may be rewarded with a greater sum or prize than the other team members. The prizes may comprise; on-line money, rebates, free merchandise, money or any similar rewards.

Next at Junction 565 the game advances to Diamond 566. At Diamond 566, it is determined whether a participant is allowed to make a game move. For example, a participant is allowed to make a game move if they have received a game piece. A game piece may be received along with the actions of an online purchase, filling out a demographic survey online or other similar actions. If the participant is not allowed to make a game move, the game goes back to Junction 565. If the participant is allowed to make a game move, the game advances to Block 568.

Next at Block 568, information is revealed to the participant, or alternatively to all of the participants in the team. Such information revelation may be the posting of a trivia question on a Web page, or transmittal of a trivia question to the participants utilizing the communication methods discussed above.

Next at Junction 569, the game participant(s) may carry out game moves. Referring now to Block 570, the participant(s) may be given the chance to vote or make a guess as to what the solution to the trivia question is. As illustrated in Block 572, the participants of each team (if appropriate) may "chat" amongst. The "chat" amongst the team members may take place using the Internet (ICQ, instant messaging, or similar online discussion methods) or over a telephone. The "chat" is generally among the participants of each team respectively. Alternatively, the "chat" may be viewed or heard by all participants in the game. Alternatively, the participant or each of the participants in the team may decide not to make a game move at this time as indicated by Block 574. If the participant or each participant in the team decides not to make a game move and passes on the question then the process of Block 574 is carried out. At Block 574, the award to be received by the participants is reduced by a pre-determined percentage. The game then advances back to Junction 565 and restarts. Each of the processes or steps described above may be carried out individually or in any combination or order.

Next at Diamond 580, it is determined whether the participant(s), or team answered the trivia question posed to them. If an answer was not made then Block 575 is carried out as described above and the participant(s) continue to participate in the game. If an answer was made, Diamond 582 is carried out. Next at Diamond 582, it is determined whether the answer made by the participant(s) was correct. If the answer was not correct then Diamond 584 is carried out. Diamond 584 will be discussed in detail below. Alternatively, if the answer given by the participants is deemed to be correct, then the process advances to Diamond 583. At Diamond 583 it is determined whether the game is over. The termination of the game may be any predetermined condition, whether internal to the game (i.e., number of correct answers) or external (i.e., stock market prices, temperatures, clearing of an auction coupled to the game, etc.) For example, in order for the game to end, the participants must give at least four correct answers before any prizes will be awarded. If the last answer given is the fourth correct answer, then the process advances to Block 598. If the answer given is not equal to four then the process returns to Junction 565, and the process continues as described above.

Next at Block 598 the participants in the Team Trivia game are awarded for sucessfully completing the game. The awards may range from money, online-money, goods, or any similar items. It is also contemplated that the participants may be awarded additional prizes depending on their individual performance in the game. Next at Block 599 the game terminates.

The remainder of the process is carried out according to the description given above for FIG. 3. Wherein like reference numerals have been utilized to depict the processes described above.

The illustrative game model carried out by process of FIGS. 3, 4, and 5, provides a game that may be carried out over a network between participants who have been selected according to some arbitrary data. FIGS. 3, 4, and 5 shows only an illustrative model of an online game according to the present invention, and should not be considered limiting.

Referring now to FIG. 6, the process associated with an example of a One-Click in combination with a Population game is shown. A Rebate game is used to illustrate both elements of One-Click games and Population games.

At Block 600, the online game begins. Next at Block 610 the Rebate Game is started. The Rebate Game can be scaled up or down, thereby being able to accommodate a small number of participants or a large number of participants. In a Rebate Game, the outcome of the game does not depend upon the number of participants, but instead relies upon the individual actions of the participants and upon the computed percentages of the different actions taken by the participants. For example, the participants are given a choice between at least two awards. To determine which participant received which award the following steps are executed. For a Rebate Game having at least two awards, each participant chooses an award from the choices posed to them. Each award is associated with a predetermined percentage value, this is the threshold value. Next a percentage value is computed based upon the participants choices. If the percentage value computed is greater than the threshold value, the participants who chose the award which lead to the higher percentage value will receive nothing. If the percentage value computed is less than the threshold value, then the participants will receive the award that they chose.

The above example is given for exemplary purposes only and should not be considered limiting. The participants may be given a plurality of choices to choose from, whereby some of the choices automatically result in a rebate where as the other choices depend upon the percentage of participants as described above. Therefore, the outcome of the game is wholly dependent upon the choices of the participants. The numbers and example given above are merely for exemplary purposes only and should not be considered limiting in any manner.

Next at Block 620, a request to participate in the online game may be transmitted to participants. The selection of participants from a base population may be performed according to the methods discussed above. Alternatively, the entire population may participate in the online game of the present process.

Next at Diamond 630, the request handler 32 processes the confirmation received from the participant(s) invited to the online game in Block 620. If an invited participant does not transmit a confirmation to server 20, then another request is sent to the participant(s). If a confirmation is received then Block 640 is carried out, as described below.

Next at Block 640, the rebate game of Block 610 is initiated. For example, a choice is transmitted to the participant(s) of the game. Alternatively, the game may be started in any manner, such as those described in detail above.

Next at Block 650, the transaction handler 34 transmits to the participants a plurality of game "moves, actions, or choices" that can be undertaken. The participants may then chose only one of these "moves, actions or choices".

Next at Diamond 660 it is determined whether the participant chose the high rebate or the low rebate. If the participant chose the low rebate then the process of Block 668 is carried out and the low rebate is automatically awarded to the participant. Alternatively if the participant chose the high rebate then the process of Diamond 665 is carried out. At Diamond 665 it is determined whether more than X percentage of participants chose the high rebate. If greater than X percentage chose the high rebate then the process advances to Block 690 and the game ends without awarding the participants any rebate. If the percentage of participants who chose the high rebate is less than X, then the process advances to Block 667. Next at Block 667 the participants who chose the high rebate are awarded the high rebate and the process advances to Block 690 where the game ends.

Although depicted as providing only two choices (a low rebate and a high rebate) to the participants, the Rebate game may be scaled to provide a plurality of choices to the participants. Whereby some choices result in an automatic rebate while the outcome of other choices is dependent upon the percentage value calculated.

Accordingly, it will be seen that this invention provides a system and method of carrying out enhanced online gaming, wherein participants are invited to participate in game play. A variable number of participants are further allowed to participate in games that normally can only be played by a fixed number of players. Additionally, the online game system 10 provides for games that can be played by a population of arbitrary size. Additionally, the participants can participate in a game that only requires a single action, that can be carried out asynchronously. Although the description above contains many specific examples, these should not be construed as limiting the scope of the invention, but merely a providing an illustration of the presently preferred embodiment of the invention. Thus the scope of this invention should be determined by the appended claims and their legal equivalents.

What is claimed is:

1. A method for providing an enhanced online community game system to a population of network participants, said method comprising:

aggregating a plurality of participants into "K" teams to participate in an online game, said game providing "K" player support;

providing a communication mechanism to said participants; and providing a voting mechanism to perform a single act for each of said "K" teams, wherein said game is a team trivia game, said team trivia game comprises:

transmitting a trivia question to each participant in one of said teams, receiving a trivia response from each said participant, determining whether said trivia response is correct, if said trivia response is correct, providing an award to at least one of said participant who provides the first correct response to said trivia question and said participant's team;

ending said team trivia game upon the occurrence of a termination event wherein said team trivia game comprises:

if said trivia response is incorrect, determining if a pre-determined number of incorrect responses have been exceeded, if said pre-determined number of incorrect responses has not been exceeded, penalizing each participant of said team, if said pre-determined number of incorrect responses has been exceeded, ending said trivia game without providing an award to said team.

2. The method according to claim 1 wherein said termination event is internal to said team trivia game.

3. The method according to claim 1 wherein said termination event is external to said team trivia game.

4. A method for providing an enhanced online community game system to a population of network participants, said method comprising:

aggregating a plurality of participants into "K" teams to participate in an online game, said game providing "K" player support;

providing a communication mechanism to said participants;

providing a voting mechanism to perform a single act for each of said "K" teams wherein said game is a visual puzzle game, said visual puzzle game comprises:

transmitting a piece of a visual puzzle to each participant, in one of said teams, receiving a visual puzzle response from each said participant, determining whether said visual puzzle response is correct, if said visual puzzle response is correct, providing an award to at least one of said participant who provides the first correct response to said visual puzzle and said participant's team;

if said visual puzzle response is incorrect, determining if a pre-determined number of incorrect responses have been exceeded, if said pre-determined number of incorrect responses has not been exceeded, penalizing each participant of said team, and if said pre-determined number of incorrect responses has been exceeded, ending said visual puzzle game without providing an award to said team.

* * * * *